United States Patent [19]
Glasa

[11] Patent Number: 5,493,900
[45] Date of Patent: Feb. 27, 1996

[54] INDICATOR FOR COMPRESSED AIR BOTTLES

[75] Inventor: Stefan Glasa, Hamburg, Germany

[73] Assignee: Bernhardt Apparatebau GmbH u. Co., Germany

[21] Appl. No.: 191,859

[22] Filed: Feb. 3, 1994

[30] Foreign Application Priority Data

Mar. 6, 1993 [DE] Germany ............ 93 03 295 U

[51] Int. Cl.$^6$ ................ G01M 3/04
[52] U.S. Cl. ................ 73/49.2
[58] Field of Search .......... 73/4, 46, 49.2, 73/49.3, 49.4, 49.8, 149

[56] References Cited

U.S. PATENT DOCUMENTS

| | | | |
|---|---|---|---|
| 3,950,983 | 4/1976 | Slinger | 73/49.8 |
| 4,023,415 | 5/1977 | Garcia . | |
| 4,528,840 | 7/1985 | Wass | 73/149 |
| 4,640,122 | 2/1987 | Héraud et al. | 73/149 |
| 4,708,014 | 11/1987 | Janitz | 73/49.2 R |
| 5,027,740 | 7/1991 | Kramer et al. . | |
| 5,105,653 | 4/1992 | Konter | 73/49.2 R |

FOREIGN PATENT DOCUMENTS

| | | |
|---|---|---|
| 1258750 | 3/1961 | France . |
| 2429601 | 6/1978 | France . |
| 2555290 | 11/1983 | France . |
| 0205996 | 1/1984 | Germany .......... 73/49.2 R |
| 0216532 | 12/1984 | Germany .......... 73/49.2 R |
| 3035766 | 6/1993 | Germany . |

OTHER PUBLICATIONS

Search Report issued in the German Utility Application (priority) But, No English Translation.
Search Report issued with the corresponding Euorpean Patent Application.

*Primary Examiner*—Richard Chilcot
*Assistant Examiner*—William L. Oen
*Attorney, Agent, or Firm*—Kelly, Bauersfeld & Lowry

[57] ABSTRACT

In order to provide an indicator (100) for compressed air bottles (10;31;50) or such for indicating the falling below a certain level of a defined pressure in the compressed air bottle (10;31;50), which ensures that it becomes discernible in the simplest manner whether a compressed air bottle possesses the requisite pressure and which prevents that, by the measuring of the pressure, an error source of pressure drops is produced, it is proposed that at least a certain portion (23;36;52) of the wall of the compressed air bottle (10;31;50) is constructed in such a way that the same is flexible so that this wall portion, at different pressures, is subject to certain different deformations.

24 Claims, 3 Drawing Sheets

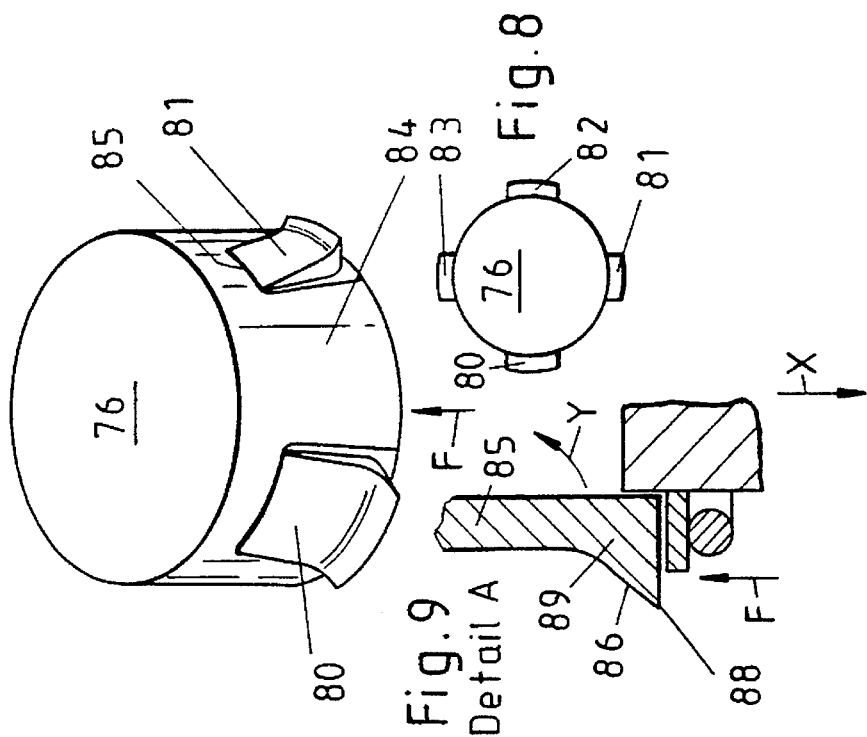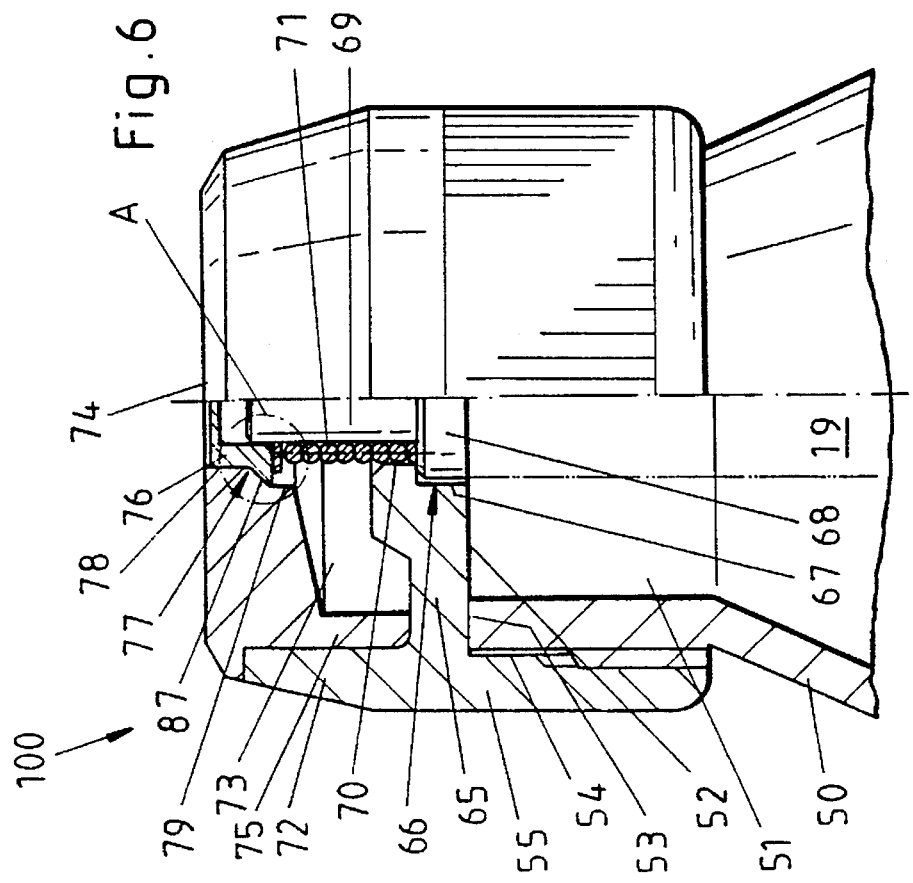

INDICATOR FOR COMPRESSED AIR BOTTLES

FIELD OF INVENTION

The present invention relates to an indicator for compressed air bottles for indicating the falling below of a defined pressure level in the compressed air bottle.

BACKGROUND OF THE INVENTION

For objects that are automatically inflatable in definable situations, such as e.g. life jackets or life rafts, replaceable pressure gas bottles are provided for effecting the inflation. In such compressed air bottles, sometimes a great deal of time passes from their being screwed into pertinent devices until they can be operated, in which case there is normally no way of telling by looking at the compressed air bottle whether the requisite degree of filling still exists.

That is why manometers were provided that are screwed into tapped holes of the pressure gas bottles and which constantly indicate the prevailing pressure. However, on this occasion it has been shown to be disadvantageous because the seals often tend to leak since, e.g. owing to an excessive torque being applied when the manometer is screwed in, these seals are crushed. It is likewise of disadvantage that, in the course of time, the threads of both manometers and pressure gas bottles often become welded together in a manner of speaking so that a refilling or repairing of the pressure gas bottle no longer is possible.

Also already known is a warning device for indicating a pressure rise in a container. The container casing possesses an aperture which is sealed-in in a gas-tight and pressure-proof manner by means of an elastically deformable covering, in which case a striker bears against the same for triggering a signal which engages into a corresponding mechanism in such way that a siren, whose actuation is controlled with the aid of compressed air by means of a plunger of the striker, can be released.

However, in this case no provision is made for except in the event of an alarm, it being visible from the outside whether the pressure conforms to the desire pressure status (DE 30 35 766 C2).

SUMMARY OF THE INVENTION

That is why it is the technical problem of the invention to provide an indicator for pressure gas bottles or the like for indicating the falling below of a defined pressure level in the compressed air bottle, which ensures that it is discernible in the simplest manner whether a compressed air bottle possesses the requisite pressure and which prevents that, by means of the pressure measurement, an error source of pressure drops from developing.

To this end it is provided according to the present invention to fabricate one or several specific portions of the pressurized casing or wall of the compressed air bottle so as to have such a slight casing thickness that the same, when subject to pressure or when not subject to any pressure loads, undergoes certain deformations which can be enlisted for the actuation of an indicator or which may serve for measuring the pressure. The pressure in such compressed air bottles ranges from 60–200 bar so that the thin-walled parts of the compressed air bottle can readily be deformed in the desired manner.

It is thereby ensured that the compressed air bottle is not damaged by the measuring of the pressure and does not lose pressure in the course of time. It is advantageously provided that the indicator possesses an indicator element which is directly or indirectly connected to the flexible part of the wall of the compressed air bottle in such a way that, independently of the deformation of the flexible portion, it assumes various positions.

In this connection, according to an embodiment, in a compressed air bottle of cylindrical configuration and having rounded-off ends, in which at the one end a threaded connection for filling with or for discharging air is provided, an indicator is fitted on the opposite side. This indicator comprises a cylindrical cap which can be of colored construction, e.g. green, which is put into an inversed position over a blowing off mechanism, which put into action as soon as the pressure in the compressed air bottle falls below a certain level. That is to say, when the pressure drops below a certain level, the indicator cap is detached and the blowing off mechanism located therebelow becomes visible. This mechanism may likewise be colored, preferably red so that, at one glance, a clear indication as to the serviceability of the compressed air bottle is obtained. The blowing off mechanism is formed by the thin-walled part constructed in the form of a metal foil which is attached balloon-like on the pertinent end of the compressed air bottle. If the compressed air bottle comprises an appropriate pressure, this balloon engages behind an indentation that is internally circumferential inside the indicator cap, i.e. an internal circumferential annular projection, while the cap is constantly acted upon by the pressure of a helical spring. As soon as, due to a decreasing internal pressure, the metal foil fails to engage behind the indentation vigorously enough, the cap is ejected by the helical spring.

In a further embodiment, the cylindrical compressed air bottle is constructed so as to be flat on the side opposite the threaded connection with the indicator being located in the flattened portion of the compressed air bottle, but is completely separated from the actual interior. In this compressed air bottle, the cylindrical wall is run beyond the actual bottom region so that a cylindrical interior is produced. The indicator together with the release mechanism is accommodated in this interior. The indicator possesses a cylindrical configuration which fills the open interior of the compressed air bottle. Centrally, the indicator is provided with an indicator pin pointing away from the compressed air bottle. On the same side of the indicator, blind end bores are constructed into which helical springs are inserted which are supported on a plate sealing the interior. This sealing plate is, in its center, provided with an opening from which the indicator pin projects provided that the compressed air bottle is filled. The actual bottom of the compressed air bottle is likewise constructed so as to be thin-walled and flexible so that the same, depending on the degree of filling and the different pressure connected therewith, exhibits an outwardly extending bulge or forms a plane surface and thus displaces the indicator in its position. In the non-filled state of the compressed air bottle, the indicator pin closes so as to be flush with the surface of the sealing plate. In the filled plate, the wall of the compressed air bottle bulges slightly in the interior so that the indicator pin is urged out through the opening in the sealing plate. The lateral surfaces of the indicator pin may be of colored construction. When the pressure in the compressed air bottle is dropping, the helical spring pressses the indicator into the original position so that the indicator pin is once more closed flush with the locking plate. The disappearance of the colored lateral surfaces thus signals to the user optically that the required degree of filling of the compressed air bottle does not exist.

According to a further advantageous construction of an indicator for compressed air bottles, provision is made for fitting a threaded connection for the indicator mechanism on the compressed air bottle, in which case, however, the opening to the interior of the compressed air bottle is firmly closed by means of a metal foil provided on the top rim of the thread so that no communication exists to the outside via this threaded connection and the metal foil forms a part of the pressurized wall of the compressed air bottle. Onto the external thread, a sealing cap is screwed, in whose interior the indicator mechanism is located. Above the metal foil, the locking cap is drilled through, in which case the internal diameter of the through bore is narrowed down in two stages from the inside to the outside. In the widest portion of the bore, a cylindrical member is to be found which rests upon the metal foil. A further cylindrical member is rigidly connected to the cylindrical member which possesses a diameter which corresponds to the diameter of that portion of the through bore having the smallest diameter. This second cylindrical member closes flush with the sealing cap in the filled state of the compressed air bottle. Into the central part of the through bore, a spiral spring is inserted which is suported on the second stage of the through bore and on the first cylindrical member. On the second cylindrical member, on the circular area which closes flush with the surface of the sealing cap, a small indicator label or plate is adhesively affixed which has a larger diameter than the through bore. In the filled state of the compressed air bottle, the circular area of the second cylindrical element is flush with the sealing cap, in the unfilled state, however, owing to the pressure exerted by the helical spring and the lacking internal pressure of the compressed air bottle onto the first cylindrical element, the metal foil is lowered downwardly and, with it, the second cylindrical element, and the small indicator plate is torn off since, due to the rim of the through bore in the sealing plate, it cannot be pulled into the sealing cap so that, by its absence, the indication is provided that the required pressure is not available.

When this indicator system is assembled, the problem arises that, in the non-filled state, the small indicator plate cannot be affixed to the second cylindrical element. In the filled state, this is, of course, possible without any difficulty. That is why a second through bore at a right angle to the first through bore is provided which passes through the first cylindrical element. A locking pin can be passed through this second through bore which thus makes an application of the small indicator plate possible. A further possibility consists in that the second cylindrical element is held back during the filling operation by means of a strong magnet. The possibility likewise exists, of course, of activating, when necessary, the indicator mechanism by means of an unblocking means.

In a further preferred embodiment of the indicator for compressed air bottles, provision is made for a threaded connection for the indicator mechanism to be secured to the compressed air bottle, in which case here, too, the opening to the interior of the compressed air bottle is firmly closed by means of a metal foil which is provided on the top rim of the opening so that no communication with the outside exists via this threaded connection and the metal foil forms a part of the pressurized wall of the compressed air bottle. Onto the external thread of the bottleneck-like configured opening of the compressed air bottle, a sealing cap is screwed, in whose interior the indicator mechanism is located. The sealing cap possesses a cover surface, in the center of which a through bore is constructed which narrows down in two stages from the inside to the outside, in which, in the wider stage of the through bore, a first cylindrical element is retained which rests firmly on the metal foil. The further part of the metal foil is covered by the cover surface. The first cylindrical element centrally supports a second cylindrical element and possesses a smaller diameter than the narrower portion of the through bore in the cover surface, while a helical spring is disposed about the second cylindrical element. The lateral wall of the sealing cap is constructed so as to project above the cover surface so that a cylindrical interior is formed which is covered at the top by a sealing plate resting upon the circumferential rim of the lateral wall. In this case the sealing plate is rigidly connected to the lateral wall and this is effected either by being in a screwed connection or by being welded to the same. In the interior the cylindrically configured indicator element is disposed, whose external diameter corresponds to the external diameter of a through bore in the sealing plate so that the indicator element, in the case of an indication, is able to issue, at least in part, from the sealing plate. The opening in the sealing plate is constructed so as to narrow down in two stages, while the outer diameter of the indicator element corresponds to the narrower portion of the through bore in the sealing plate. The indicator element is constructed in the form of a pot-like hollow member and, by preference, possesses four laterally projecting locking elements which are attached elastically to the indicator element and possess a bearing section which can be put against a retaining section in the sealing plate. In this case the locking elements are mounted in the indicator element so as to be elastically swivellable. However, the indicator element is constructed so as to be hollow-cylindrical and the second cylindrical element can be inserted into the indicator element like a piston. In the position in which the second cylindrical element is located when the compressed gas bottle is correctly filled, the same is inserted so far into the indicator element that the locking elements are blocked. These are then incapable of swivelling out of their locking position in which they engage behind the bearing surface of the retaining section in the sealing plate so that the indicator element is firmly retained in the sealing plate. However, when the pressure drops and, due to the action of the spring, a deformation of the metal foil results, the second cylindrical element moves out of the indicator element. At this instant the locking elements are able to travel inwardly into the interior of the indicator element and the indicator element is no longer mounted in the sealing plate. Subjected to the influence of the helical spring, the indicator element is pushed through the through bore aperture in the sealing plate and is ejected so to speak. All that then still shows of the sealing plate is merely a hole so that it is at once discernible from the outside that the pressure has dropped below a certain predetermined limit.

BRIEF DESCRIPTION OF THE DRAWINGS

In the following the embodiment examples are explained in greater detail with the aid of the drawings. Thus, in purely schematic illustrations:

FIG. 6 shows a partially sectioned side view of a further embodiment of the indicator for compressed air bottles having an indicator element;

FIG. 7 shows the indicator element in an enlarged individual illustration;

FIG. 8 shows, in a reduced illustration the indicator element as per FIG. 7 from the tip, and FIG. 9 shows a detail of the FIG. 6 in a vertical sectioned illustration.

DETAILED DESCRIPTION OF THE PREFERRED EMBODIMENT

Figure 1:
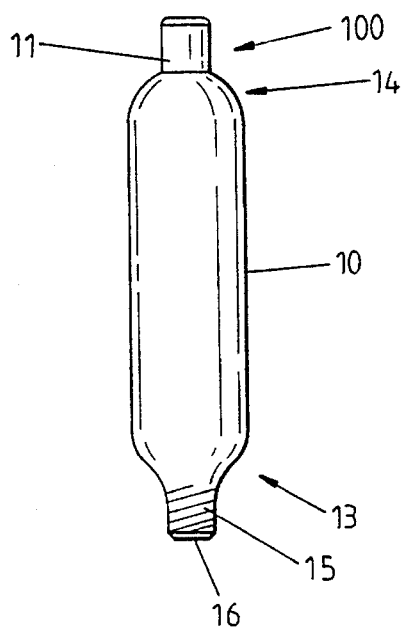
FIG. 1 shows a side view of a compressed air bottle with indicator cap.
Figure 2:
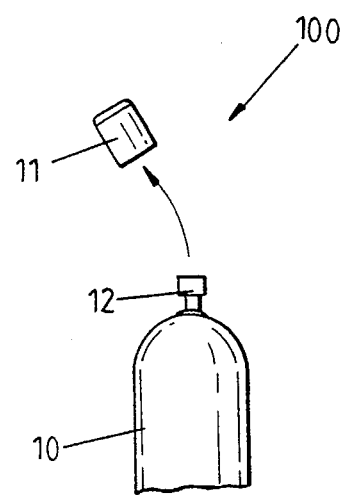
FIG. 2 shows a partial side view of the compressed air bottle with blown-off indicator cap.
Figure 3:
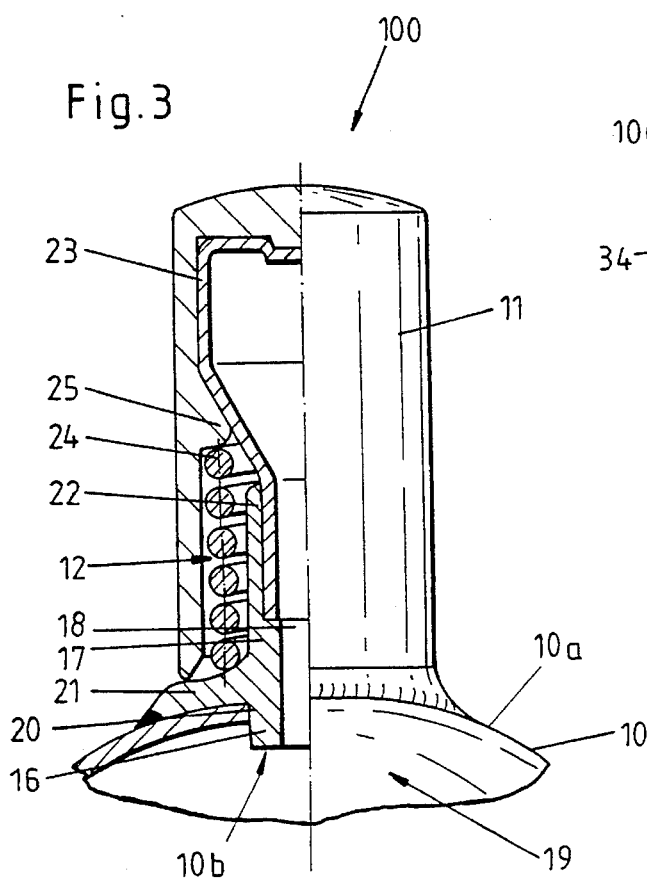
FIG. 3 shows a partially sectioned side view of the indicator cap with the blowing off mechanism of the compressed air bottle as per FIG. 1.

In the FIGS. 1 to 3, an embodiment of an indicator 100 for compressed air bottles 10 is depicted, whose indicator 100 is constructed in the form of an indicator cap 11 with a blowing off mechanism 12. The compressed air bottle 10 possesses a cylindrical configuration with rounded-off ends 13 and 14. On one of the rounded-off ends 13, a connecting element 15 with an air outlet orifice 16 is provided, and on the opposite rounded-off end 14, the indicator cap 11 with the blowing-off mechanism is located. The indicator 100 possesses a connecting element 16 which is firmly and tightly connected to the compressed air bottle 10. Said connecting element 16 is comprised of a cylindrical main portion 17 which is provided with an internal bore 18 which leads into the interior 19 of the compressed air bottle 10. On the end 20 of the connecting element 16 facing the compressed air bottle, a circumferential disk 21 is located which is adapted to the outward bulge of the compressed air bottle 10. The large supporting area of the connecting element 16 to the compressed air bottle 10 provided thereby serves for the stable attachment. On the side 22 facing away from the compressed air bottle 10, a kind of balloon comprised of e.g. metal foil plate is attached to the internal bore 18 and firmly and tightly connected to the connecting element 16 and, with this, to the compressed air bottle 10. Consequently the pressure in the balloon 23 is equal to the pressure in the compressed air bottle 10. Between the compressed air bottle 10 and the circumferential projection 25, a helical spring 24 is located on the connecting element 16, whereby the blowing off mechanism is formed. Above this blowing off mechanism 12, the indicator cap 11 is located. The same is fitted onto the compressed air bottle 10 when the latter is in the non-filled state.

When the compressed air bottle 10 is filled, the balloon 23 expands slightly and thus fixes the indicator cap 11, which is provided with a circumferential indentation 25 in the interior so that, at this point, the indicator cap 11 possesses a smaller diameter than the balloon 23 and retains the same therewith.

Figure 4:
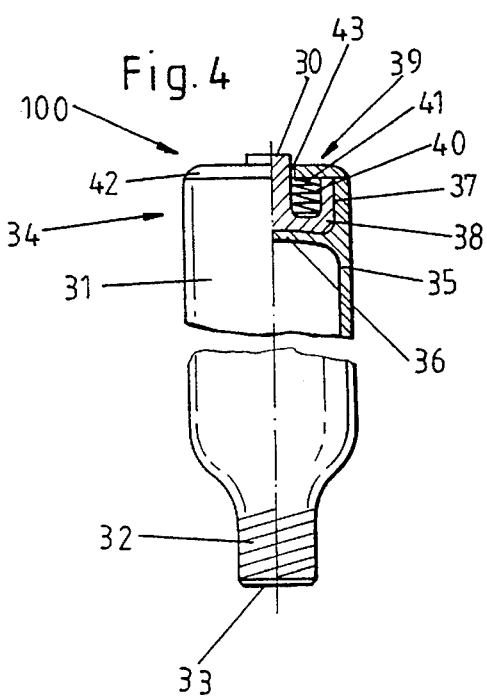
FIG. 4 shows a partially sectioned side view of a further embodiment of an indicator for compressed air bottles with indicator pin.

The embodiment according to FIG. 4 possesses an indicator pin 30 in the form of an indicator. The compressed air bottle 31 of this embodiment possesses a cylindrical configuration, in which case, on the one side, a connecting element 32 and an air outlet orifice 33 are provided. On the opposite side 34, the side wall 35 is passed beyond the thin bottom wall 36 so that a cylindrical interior 37 is produced. The bottom wall 36 is comprised of a thin material which is capable of bulging outwardly when subjected to pressure. In the interior 37, the indicator element 38 is located which possesses a configuration that fills the cylindrical interior 37. On the side 39 which faces away from the compressed air bottle 31, an indicator pin 30 is provided in the center. Blind end bores 40 are constructed around the indicator pin 30 in the indicator element 38, into which the helical springs 41 are inserted. The interior 37 is covered by a sealing plate 42 which is rigidly connected to the outer wall 35. An aperture 43 is located in the center, through which the indicator pin 30 is passed. The helical springs 41 are supported between the bottom of the blind end bores 40 and the inside of the sealing plate 42. The length of the indicator pin 30 is dimensioned in such a way that, in the non-filled state of the compressed air bottle 31, the indicator pin 30 closes flush with the sealing plate 42.

In the filled state of the compressed air bottle 31, the bottom wall 36 bulges slightly outward so that the indicator pin thus projects from the aperture of the sealing plate 42.

Figure 5:
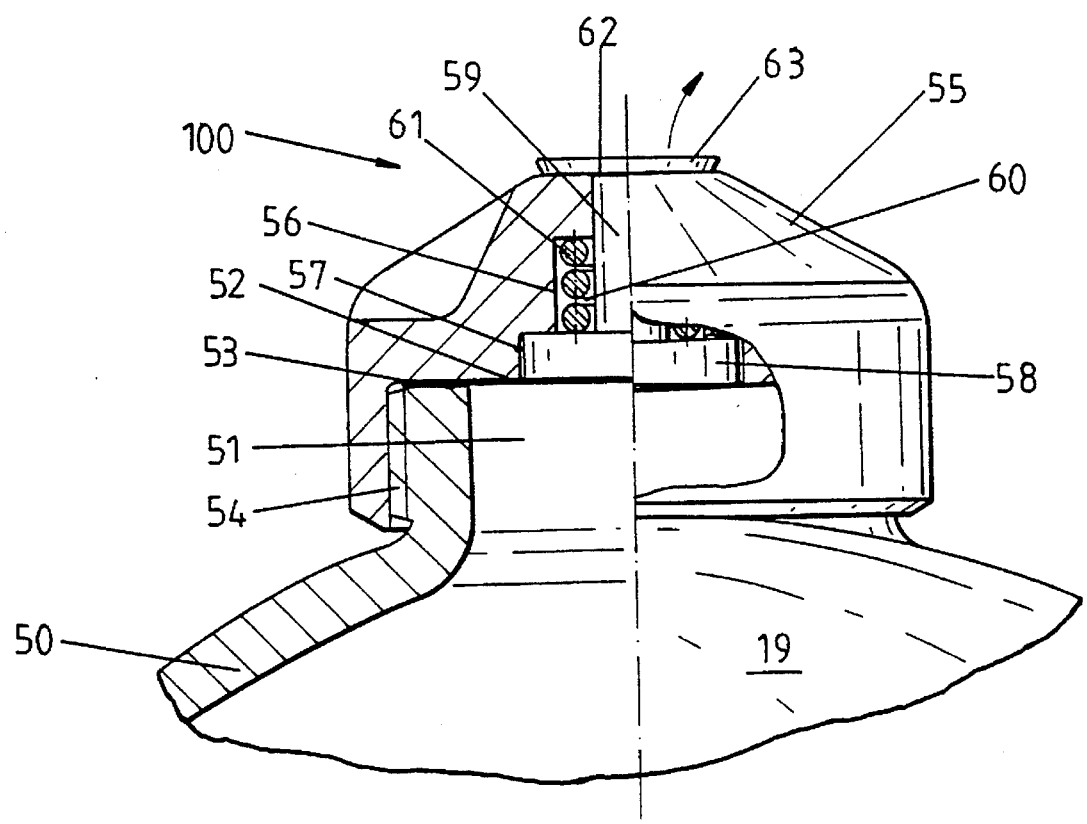
FIG. 5 shows a partially sectioned side view of a further embodiment of an indicator for compressed air bottles with small indicator plate.

The embodiment according to FIG. 5 possesses an opening 51 on the compressed air bottle 50 which is provided with a metal foil which is rigidly connected to the top circumferential rim 53 of the threaded opening 53. A sealing cap 55 is screwed onto the thread 54 of the threaded opening 51. This sealing cap 55, in its center, is provided with a through bore 56 which narrows down from the inside in two stages. In the widest stage 57 of the through bore 56, a cylindrical element 58 is supported which rests upon a metal foil 52. This cylindrical element 58, in its center, is provided with a second cylindrical element 59 which has the same diameter as the narrowest portion of the through bore 56. In the central portion 60 of the through bore 56, a helical spring 61 is located which surrounds the second cylindrical element 59 and is supported on the cylindrical element 58 and the sealing cap 55. In the filled state, the metal foil 52 is planar so that the second cylindrical element 59 closes flush with the sealing cap 55. Onto the circular surface 62 of the second element 59, which is cylindrically visible in the through bore 56, a small indicator plate 63 is adhesively affixed, whose diameter is larger than that of the through bore 56. In the non-filled state of the compressed air bottle 50, the metal foil 52 bulges inwardly so that the cylindrical elememnts 58 and 59 have travelled in the direction of the compressed air bottle 50 due to the helical sping 61 and the small indicator plate 63 is torn off. The right-hand side of FIG. 5 reproduces the non-filled and the left-hand side the filled state.

In the FIGS. 6 through 9, a further embodiment of the indicator is depicted which, in its basic construction, resembles the embodiment according to FIG. 5. Also on this occasion, the compressed air bottle 50 is provided with an opening 51 which is firmly sealed with the aid of a metal foil 52 which is firmly connected to the top circumferential rim 53 of the bottleneck-like configured opening 51. A sealing cap 55 is screwed onto the external thread 54 of the bottleneck-like opening 51. In this case the metal foil is disposed in such a way that no communication whatever exists with the outside of the pressure space via the opening 51 since the metal foil forms the flexible portion of the wall of the compressed air bottle 50. The sealing cap 55 possesses a cover area 65 that engages over the opening 51 and, with it, the metal foil 52, in which, in the center, a through bore 66 is constructed which narrows down in two stages from the inside to the outside. In the lower wider stage 67 of the through bore 66, a first cylindrical element 68 is retained which rests firmly on the metal foil 52. In this case, the metal foil is fully covered and supported by the first cylindrical element 68 and the cover area 65. The first cylindrical element 68 carries in its center a second cylindrical element 69. This second cylindrical element 69 possesses a smaller diameter than the narrower stage 70 of the through bore 66 in the cover area 65. A helical spring 71 is disposed around the second cylindrical element 69.

The side wall 72 of the sealing cap 55 is constructed so as to project above the cover area and surrounds a cylindrical interior 73 which is open at the top. The same is covered by means of sealing plate 74 placed upon the circumferential of the side wall 72 which is rigidly connected with the lateral wall 72 which is rigidly connected to the side wall 72 in that it is in screwed connection with a downwardly projecting section 75 with the side wall 72. In the interior 73, an indicator element 76 is disposed which is of cylindrical configuration. In the sealing plate 74, a through bore 77 is constructed which narrows down in two stages, in which case the external diameter of the indicator element 76 corresponds to the interior diameter of the narrower portion 78 of the through bore 77, whereas the lower second portion 79 of the through bore 77 possesses a larger diameter.

The indicator element 76 is constructed in the form of a pot-like hollow member and possesses four locking elements 80,81, 82,83 disposed in the side wall. By means of notches proceeding in the longitudinal direction of the indicator element they are separated from the side wall 74 of the indicator element in such a way that they remain connected only by means of a connecting line 85 with the indicator element and, for this reason, are elastically arranged on the same. In this case, each locking element, on its free end, possesses a widened portion which carries a bearing area 86 externally. The transitional region between the first stage 78 and the second stage 79 of the through bore 77 in the sealing plate 74 is constructed in the form of an inclined plane 87, which, in its configuration, corresponds to the bearing surface 86 of each locking element 80,81,82,83. The lower rim 78 of the indicator element 76 is supported upon the helical spring 71, which, in turn, is supported on the first cylindrical element 68. That is why the helical spring 71 presses from below against the detector element 76 which would pass through the through bore 77 in the sealing plate 74 if the bearing surfaces 86 of the locking elements 80,81,82,83 were not bearing against the inclined plane 87 in the sealing plate 74 and would thus hold back the indicator element 76. The locking elements 80,81,82,83 are in this case, when the compressed air bottle is in the filled state, prevented from swivelling inwardly and from releasing the indicator element 76 since the indicator element 76 is constructed in a hollow cylindrical fashion and the second cylindrical element 69 is inserted into the indicator element like a piston. In the position in which the second cylindrical element is when the compressed air bottle 50 is correctly filled, the second cylindrical element 69 is inserted so far into the indicator element 76 that the locking elements 80,81,82,83 are blocked against an inward swivelling. The same are then incapable of swivelling out of their locking position, in which position they engage, with their bearing surface 86, behind the mounting section in the sealing plate 74 formed by the inclined plane 87 so that the indicator element 76 is rigidly retained in the sealing plate 74.

However, if for any reason whatsoever the pressure in the compressed air bottle 50 were to drop and, due to the action of the helical spring 71, a deformation of the metal foil 52 in the direction of the interior 19 were to result, the second cylindrical element 68 travels out of the indicator element 76 in the direction identified by X in the drawing. At this instant the locking elements 80,81,82,83 are able to move inwardly in the direction Y in the interior of the indicator element 76 and the indicator element 76 is no longer mountedly retained in the sealing plate 74. Owing to the action of force F of the helical spring 71, the indicator element 76 is pushed through the through bore opening 77 in the sealing plate 74. Depending on the dimensioning of the helical spring 71, the indicator element either projects or is ejected altogether. At any event, it becomes discernible at once from the outside that the pressure has fallen below a certain predetermined limit.

What is claimed is:

1. A burst-proof compressed air bottle or the like, comprising:

a gas-tight casing including a wall having a rigid main portion and a flexible portion that cooperatively hold and store compressed air, wherein the flexible portion is subject to certain deformations at different pressures within the casing;

a sealable air outlet orifice through the main portion of the casing; and an indicator responsive to deformation of the flexible portion for indicating the falling below of a defined pressure level in the casing.

2. A compressed air bottle according to claim 1, characterized in that the indicator (100) possesses an indicator element which is connected either directly or indirectly with the flexible portion (23;36;52) of the wall of the compressed air bottle (10;31;50) so that it, in dependence upon the deformation of the flexible portion (23;36;52), assumes different positions.

3. A compressed air bottle according to claim 1, characterized in that the indicator (100), in the form of an indicator element, possesses an indicator cap (11) and a blowing off mechanism (12), the blowing off mechanism (12) comprising a connecting element (16) which, within the region of a casing perforation (10b) of the compressed air bottle, is firmly and tightly connected to the compressed air bottle and is disposed so as to project into the casing perforation and is comprised of a main part (17) which is provided with an internal bore (18) which leads through the perforation into the interior (19) of the compressed air bottle (10), in which the end (20) of the connecting element (16) facing the compressed air bottle (10) carries a circumferential disk (21) that is adapted to the external surface (10a) of the compressed air bottle (10) and in which, on the side (22) of the connection element (16) facing away from the compressed air bottle (10), a balloon (23) preferably of elastic metal is attached to the internal bore (18) in the form of a flexible portion of the wall and in that the indicator cap (11) engages completely over the balloon (23), engages below an internal circumferential annular projection (25) in such a fashion that the indicator cap (11) is firmly mounted on the balloon (23), in that, between the compressed air bottle (10) or the circumferential disk (21) of the connecting element (16) and the projection (25), a helical spring (24) is located, with the aid of which constant pressure is exerted upon the indicator cap (11) which, however, is retained by the projection (25) which is acted upon by the spring (24), while the circumferential projection (25) possesses a smaller diameter than the balloon (23).

4. A compressed air bottle according to claim 3, characterized in that the balloon is comprised of a springable elastic metal, such as e.g. steel.

5. A compressed air bottle according to claim 4, characterized in that the indicator cap (11) and the blowing off mechanism (12) are of colored construction.

6. A compressed air bottle according to claim 5, characterized in that the connection between the compressed air bottle (10) and the connecting element (16), as well as the connection between the connecting element (16) and the balloon (23), is welded.

7. A compressed air bottle according to claim 1, characterized in that the compressed air bottle (31) possesses a cylindrical configuration, in which, on the one side (34), the side wall (35) is constructed so as to project over the bottom wall (36) constructed in the form of a flexible portion of the wall of the compressed air bottle (31) so that a cylindrical interior (37) is formed, into which the indicator element (38) is inserted which possesses a shape entirely filling the cylindrical interior, wherein, on the side (39) of the indicator element (38) facing away from the compressed air bottle (31), an indicator pin (30) is centrally disposed and in that, around said indicator pin (30), blind end bores are constructed, into which helical springs (41) are inserted, and in that the interior (37) is covered by a sealing plate (42) which is rigidly connected with the external wall (35) and which is provided with an aperture (43), through which the indicator pin (30) is passed, in that each helical spring (41) is supported between the bottom of the respective blind end bore (40) and the inside of the sealing plate (42) and in that the length of the indicator pin (30) or the: height of the indicator element (38) is dimensioned in such a way that the indicator pin (30), when the compressed air bottle (31) is correctly filled and, consequently, when the bottom wall (36) bulges slightly outwardly, projects slightly from the aperture (43) of the sealing plate (42) and, in the non-filled state of the compressed air bottle (31), closes flush with the sealing plate (42).

8. A compressed air bottle indicator according to claim 7, characterized in that the lateral surface of the indicator pin (30) is of colored construction.

9. A compressed air bottle according to claim 7, characterized in that the sealing plate (42) is in screwed connection with the compressed air bottle (31).

10. A compressed air bottle according to claim 7, characterized in that the sealing plate (42) is welded to the compressed air bottle (31).

11. A compressed air bottle according to claim 1, characterized in that the compressed air bottle (50) possesses a bottleneck-like opening (51) having an external thread (54), which is sealed by means of a metal foil (52), which is firmly connected with the top circumferential rim (53) of the opening (51), in which a sealing cap (55) is screwed onto the thread (54) of the threaded opening (51), in that the sealing cap (55), in its center, possesses a through bore (56) which narrows down in two stages from the inside to the outside, wherein, in the widest stage (57) of the through bore (56), a cylindrical element (58) is inserted which rests upon the metal foil (52) and, in the center, possesses a second cylindrical element (59) which has the same diameter as the narrowest portion of the through bore (56), in that, in the central portion (60) of the through bore (56), a helical spring is inserted which surrounds the cylindrical element (59) and is supported on the cylindrical element (58) and on the sealing cap (55), and in that the second cylindrical element (59) is dimensioned in its length in such a way that the circular area. (62) visible from the through bore (56), in the nonfilled state of the compressed air bottle (50), closes flush with the sealing cap (55), in which, on the circular area (62) a small indicator plate (63) is adhesively affixed in the form of an indicator element, whose diameter is larger than that of the through bore (56), and in that the metal foil (52), in the non-filled state of the compressed air bottle (50), bulges outwardly toward the interior (19) of the compressed air bottle (50), while the metal foil (52) constitutes the flexible portion of the wall.

12. A compressed air bottle according to claim 1, characterized in that the compressed air bottle (50) has a bottleneck-like opening (51) with an external thread (54), which is firmly sealed by means of a metal foil (52) which is rigidly connected with the upper circumferential rim (53) of the opening (51), wherein a sealing cap (55) is screwed onto the thread (54) of the opening (51), in that the sealing cap (55), in its center, possesses a through bore (66) which narrows down in two stages from the inside to the outside, while into the widest stage (67), a first cylindrical element (68) is inserted which rests upon the metal foil (52) and which, in its center, is provided with a second cylindrical element (69) which has a smaller diameter than the narrower portion (68) of the through bore (66), in that the side wall (72) of the sealing cap (55) is constructed so as to project over the cover area (65) provided with the through bore (66), so that an interior (73) is formed which is covered by a sealing plate (74) which is rigidly connected to the side wall (72) of the sealing cap (55) and which possesses a central through bore (77), while, into the interior (73), a cylindrically configured indicator element (76) is inserted, whose external diameter corresponds to that of the through bore (77) in the sealing plate (74) and which has a locking element (80,81,82,83) projecting on at least one side, which is elastically secured to the indicator element and has a bearing surface (86) that engages behind a retaining section (87) of the sealing plate (74) and is disposed in such a way as to be swivelable into a release position, while each locking element (80,81,82,83) can be blocked by the second cylindrical element (69) into the position in which it retains the indicator element (76), and in that, between the first cylindrical element (68) and the indicator element (76), a helical spring (71) is disposed, with the aid of which constant pressure is exerted upon the indicator element (76) which, however, is retained in its position by the locking element or elements (80,81,82,83) when the compressed air bottle (50) is filled, in which case the metal foil (52), which constitutes the flexible portion of the wall of the compressed air bottle (50), in the non-filled state of the compressed air bottle (50), bulges toward the interior (51) of the compressed air bottle (50) so that the second cylindrical element (69) releases the indicator element (76).

13. A compressed air bottle element according to claim 12, characterized in that the through bore (77) in the sealing plate (72) is constructed so as to narrow down in two stages, in that the external diameter of the indicator element (76) corresponds to the narrower portion (78) of the through bore (77) in the sealing plate (74) and that the transitional region between the wider portion (79) of the through bore (77) and the narrower portion (78) of the through bore (77), constructed in the form of an inclined plane (87), constitutes the retaining section, upon which the bearing surface (86) of each locking element (80,81,82,83) is supported in its position in which it mountedly retains the indicator element (76).

14. A compressed air bottle element according to claim 13, characterized in that four locking elements (80,81,82,83) are provided which are symmetrically disposed on the indicator element, each of which being constructed so as to constitute a section of the external wall (84) of the hollow cylindrical indicator element (76) and forming a locking member swivelable out of the wall plane with a bearing portion (89) disposed on a free terminal edge (88) with the bearing area (86).

15. A compressed air bottle according to claim 2, characterized in that the indicator (100), in the form of an indicator element, possesses an indicator cap (11) and a blowing off mechanism (12), the blowing off mechanism

(12) comprising a connecting element (16) which, within the region of a casing perforation (10b) of the compressed air bottle, is firmly and tightly connected to the compressed air bottle and is disposed so as to project into the casing perforation and is comprised of a main part (17) which is provided with an internal bore (18) which leads through the perforation into the interior (19) of the compressed air bottle (10), in which the end (20) of the connecting element (16) facing the compressed air bottle (10) carries a circumferential disk (21) that is adapted to the external surface (10a) of the compressed air bottle (10) and in which, on the side (22) of the connection element (16) facing away from the compressed air bottle (10), a balloon (23) preferably of elastic metal is attached to the internal bore (18) in the form of a flexible portion of the wall and in that the indicator cap (11) engages completely over the balloon (23), engages below an internal circumferential annular projection (25) in such a fashion that the indicator cap (11) is firmly mounted on the balloon (23), in that, between the compressed air bottle (10) or the circumferential disk (21) of the connecting element (16) and the projection (25), a helical spring (24) is located, with the aid of which constant pressure is exerted upon the indicator cap (11) which, however, is retained by the projection (25) which is acted upon by the spring (24), while the circumferential projection (25) possesses a smaller diameter than the balloon (23).

16. A compressed air bottle according to claim 2, characterized in that the connection between the compressed air bottle (10) and the connecting element (16), as well as the connection between the connecting element (16) and the balloon (23), is welded.

17. A compressed air bottle according to claim 2, characterized in that the compressed air bottle (31) possesses a cylindrical configuration, in which, on the one side (34), the side wall (35) is constructed so as to project over the bottom wall (36) constructed in the form of a flexible portion of the wall of the compressed air bottle (31) so that a cylindrical interior (37) is formed, into which the indicator element (38) is inserted which possesses a shape entirely filling the cylindrical interior, wherein, on the side (39) of the indicator element (38) facing away from the compressed air bottle (31), an indicator pin (30) is centrally disposed and in that, around said indicator pin (30), blind end bores are constructed, into which helical springs (41) are inserted, and in that the interior (37) is covered by a sealing plate (42) which is rigidly connected with the external wall (35) and which is provided with an aperture (43), through which the indicator pin (30) is passed, in that each helical spring (41) is supported between the bottom of the respective blind end bore (40) and the inside of the sealing plate (42) and in that the length of the indicator pin (30) or the height of the indicator element (38) is dimensioned in such a way that the indicator pin (30), when the compressed air bottle (31) is correctly filled and, .consequently, when the bottom wall (36) bulges slightly outwardly, projects slightly from the aperture (43) of the sealing plate (42) and, in the non-filled state of the compressed air bottle (31), closes flush with the sealing plate (42).

18. A compressed air bottle according to claim 17, characterized in that the lateral surface of the indicator pin (30) is of colored construction.

19. A compressed air bottle according to claim 18, characterized in that the sealing plate (42) is in screwed connection with the compressed air bottle (31).

20. A compressed air bottle according to claim 18, characterized in that the sealing plate (42) is welded to the compressed air bottle (31).

21. A compressed air bottle according to claim 2, characterized in that the compressed air bottle (50) possesses a bottleneck-like opening (51) having an external thread (54), which is sealed by means of a metal foil (52), which is firmly connected with the top circumferential rim (53) of the opening (51), in which a sealing cap (55) is screwed onto the thread (54) of the threaded opening (51), in that the sealing cap (55), in its center, possesses a through bore (56) which narrows down in two stages from the inside to the outside, wherein, in the widest stage (57) of the through bore (56), a cylindrical element (58) is inserted which rests upon the metal foil (52) and, in the center, possesses a second cylindrical element (59) which has the same diameter as the narrowest portion of the through bore (56), in that, in the central portion (60) of the through bore (56), a helical spring is inserted which surrounds the cylindrical element (59) and is supported on the cylindrical element (58) and on the sealing cap (55), and in that the second cylindrical element (59) is dimensioned in its length in such a way that the circular area (62) visible from the through bore (56), in the nonfilled state of the compressed air bottle (50), closes flush with the sealing cap (55), in which, on the circular area (62), a small indicator plate (63) is adhesively affixed in the form of an indicator element, whose diameter is larger than that of the through bore (56), and in that the metal foil (52), in the non-filled state of the compressed air bottle (50), bulges outwardly toward the interior (19) of the compressed air bottle (50), while the metal foil (52) constitutes the flexible portion of the wall.

22. A compressed air bottle according to claim 2, characterized in that the compressed air bottle (50) has a bottleneck-like opening (51) with an external thread (54), which is firmly sealed by means of a metal foil (52) which is rigidly connected with the upper circumferential rim (53) of the opening (51), wherein a sealing cap (55) is screwed onto the thread (54) of the opening (51), in that the sealing cap (55), in its center, possesses a through bore (66) which narrows down in two stages from the inside to the outside, while into the widest stage (67), a first cylindrical element (68) is inserted which rests upon the metal foil (52) and which, in its center, is provided with a second cylindrical element (69) which has a smaller diameter than the narrower portion (68) of the through bore (66), in that the side wall (72) of the sealing cap (55) is constructed so as to project over the cover area (65) provided with the through bore (66), so that an interior (73) is formed which is covered by a sealing plate (74) which is rigidly connected to the side wall (72) of the sealing cap (55) and which possesses a central through bore (77), while, into the interior (73), a cylindrically configured indicator element (76) is inserted, whose external diameter corresponds to that of the through bore (77) in the sealing plate (74) and which has a locking element (80,81,82,83) projecting on at least one side, which is elastically secured to the indicator element and has a bearing surface (86) that engages behind a retaining section (87) of the sealing plate (74) and is disposed in such a way as to be swivelable into a release position, while each locking element (80,81,82,83) can be blocked by the second cylindrical element (69) into the position in which it retains the indicator element (76), and in that, between the first cylindrical element (68) and the indicator element (76), a helical spring (71) is disposed, with the aid of which constant pressure is exerted upon the indicator element (76) which, however, is retained in its position by the locking element or elements (80,81,82,83) when the compressed air bottle (50) is filled, in which case the metal foil (52), which constitutes the flexible portion of the wall of the compressed air bottle (50), in the non-filled state of the compressed air bottle (50), bulges toward the interior (51) of the compressed air bottle (50) so that the second cylindrical element (69) releases the indicator element (76).

23. A compressed air bottle element according to claim 22, characterized in that the through bore (77) in the sealing plate (72) is constructed so as to narrow down in two stages, in that the external diameter of the indicator element (76) corresponds to the narrower portion (78) of the through bore (77) in the sealing plate (74) and that the transitional region between the wider portion (79) of the through bore (77) and the narrower portion (78) of the through bore (77), constructed in the form of an inclined plane (87), constitutes the retaining section, upon which the bearing surface (86) of each locking element (80,81,82,83) is supported in its position in which it mountedly retains the indicator element (76).

24. A compressed air bottle element according to claim 22, characterized in that four locking elements (80,81,82,83) are provided which are symmetrically disposed on the indicator element, each of which being constructed so as to constitute a section of the external wall (84) of the hollow cylindrical indicator element (76) and forming a locking member swivelable out of the wall plane with a bearing portion (89) disposed on a free terminal edge (88) with the bearing area (86).

* * * * *